United States Patent [19]
Harwood et al.

[11] 3,917,876
[45] Nov. 4, 1975

[54] PROCESS FOR PRODUCTION OF A SIMULATED MEAT PRODUCT

[75] Inventors: Charles C. Harwood, Elgin; Donald W. Quass, Downers Grove, both of Ill.

[73] Assignee: The Quaker Oats Company, Barrington, Ill.

[22] Filed: June 3, 1974

[21] Appl. No.: 475,756

Related U.S. Application Data

[63] Continuation-in-part of Ser. Nos. 274,162, July 24, 1972, abandoned, Ser. No. 274,163, July 24, 1972, abandoned, Ser. No. 274,164, July 24, 1972, abandoned, and Ser. No. 274,165, July 24, 1972, abandoned.

[52] U.S. Cl. ............... 426/585; 426/580; 426/647; 426/656; 426/657; 426/802
[51] Int. Cl.² .......................................... A23J 3/00
[58] Field of Search .......... 426/104, 351, 362, 364, 426/802

[56] References Cited
UNITED STATES PATENTS

| | | | |
|---|---|---|---|
| 3,142,571 | 7/1964 | McAnelly | 426/205 X |
| 3,440,054 | 4/1969 | Sair | 426/364 X |
| 3,537,859 | 11/1970 | Hamdy | 426/364 X |
| 3,645,747 | 2/1972 | Palmer | 426/364 |

*Primary Examiner*—James R. Hoffman
*Attorney, Agent, or Firm*—Donnie Rudd

[57] ABSTRACT

A process is disclosed for preparing a puffed food product simulating meat. The process comprises admixing a protein material of a certain type having specified protein concentrations with specified amounts of water and a lubricating substance, subjecting the mixture to increased shear, extruding the mixture without puffing it, placing the extrudate in a confined space, subjecting the extrudate to a waterboiling temperature for a specified time at a specified pressure, and instantly releasing the pressure on the extrudate causing it to puff and resemble simulated meat.

29 Claims, No Drawings

PROCESS FOR PRODUCTION OF A SIMULATED MEAT PRODUCT

CROSS REFERENCE TO RELATED APPLICATIONS

This application is a continuation-in-part of patent applications Ser. Nos. 274,162, 274,163, 274,164, and 274,165 all filed July 24, 1972 and all now abandoned.

BACKGROUND OF THE INVENTION

1. Field of the Invention

This invention relates to a simulated meat product produced from concentrated proteinaceous materials.

2. Description of the Prior Art

Many attempts have been made to produce simulated meat products from relatively inexpensive protein sources. Perhaps the most successful of these processes has been the so-called spun protein which utilizes small strands of protein bound together by a binder to simulate meat. Thus far, however, no one has produced a simulated meat product which has the taste and particularly the texture characteristics of natural meat. This invention makes possible a simulated meat product high in protein and having the same texture characteristics as natural meat.

SUMMARY OF THE INVENTION

It is an object of this invention to provide a process for preparing a puffed food product simulating meat and having the texture characteristics of meat.

It is another object of this invention to provide a process for utilizing relatively inexpensive proteinaceous materials to prepare a simulated meat product.

The objects of this invention are accomplished in a process for preparing a puffed food product simulating meat comprising:

A. admixing a proteinaceous mixture of a protein material comprising a member selected from the group consisting of oil seed vegetable protein, casein, caseinate salts, gelatin, microbiological protein, egg white, muscle protein, keratins, lactalbumin, and blood having a protein concentration of at least about 30 percent with water in an amount sufficient to provide a final moisture content of from about 15 percent to about 40 percent by weight;

B. subjecting the moistened proteinaceous mixture to increased shear sufficient to raise the temperature above 212°F. thereby converting it into a flowable substance;

C. extruding the flowable substance in a uniform linear flow as an extrudate into a medium of lower pressure while maintaining the density of the extrudate substantially the same;

D. placing the extrudate in a confined space;

E. subjecting the extrudate in the confined space to a temperature above 212°F. for a time of from 5 to 100 seconds and a pressure of from 100 psi to 250 psi; and F. instantly releasing the pressure within 2 seconds on the extrudate causing the extrudate to puff and resemble simulated meat;

said process further including admixing from about ½ to about 3 percent by weight of a lubricating substance comprising a member selected from the group edible fats and oils, edible fatty acids, edible stearates, and edible polylactic acid esters of fatty acids, with the proteinaceous mixture of protein material prior to subjecting it to the increased shear.

The objects of this invention are further accomplished by a preferred embodiment of our invention which comprises a process of preparing a puffed food product which comprises subjecting moist, protein material comprising a member selected from the group consisting of oil seed vegetable protein, casein, caseinate salts, microbiological protein, egg white, muscle protein, keratins, lactalbumin, and blood in the presence of sufficient water and at conditions sufficient to form a moisture containing translucent to glassy product, partly drying said translucent to glassy product to reduce its moisture content and puffing said partly dried product by placing the extrudate in a confined space; subjecting the extrudate in the confined space to a temperature above 212°F. for a time of from 5 to 100 seconds and a pressure of from 100 psi to 250 psi; and instantly releasing the pressure within 2 seconds on the extrudate causing the extrudate to puff and resemble simulated meat; said process further including admixing from about ½ to about 3 percent by weight of a lubricating substance comprising a member selected from the group edible fats and oils, edible fatty acids, edible stearates, and edible polylactic acid esters of fatty acids, with the moist protein material.

The objects of this invention are further accomplished by a process for preparing a puffed food product simulating meat comprising:

A. admixing a proteinaceous mixture of a protein material comprising a member selected from the group consisting of oil seed vegetable protein, casein, caseinate salts, gelatin, microbiological protein, egg white, muscle protein, keratins, lactalbumin, and blood having a protein concentration of at least about 30 percent with water in an amount sufficient to provide a final moisture content of from about 15 percent to about 40 percent by weight;

B. subjecting the moistened proteinaceous mixture to superatmospheric pressure thereby converting it into a flowable substance;

C. extruding the flowable substance in a uniform linear flow as an extrudate into a medium of lower pressure while maintaining the density of the extrudate substantially the same;

D. placing the extrudate in a confined space;

E. subjecting the extrudate in the confined space to a temperature above 212°F. for a time of from 5 to 100 seconds and a pressure of from 100 psi to 250 psi; and F. instantly releasing the pressure within 2 seconds on the extrudate causing the extrudate to puff and resemble simulated meat;

said process further including admixing from about ½ to about 3 percent by weight of an edible oil in the form of an edible oil or oil bearing material with the proteinaceous mixture of protein material prior to subjecting it to the elevated pressure.

The objects of this invention are further accomplished by a process for preparing a puffed food product simulating meat comprising:

A. admixing a proteinaceous mixture of a protein material comprising a member selected from the group consisting of oil seed vegetable protein, casein, caseinate salts, gelatin, microbiological protein, egg white, muscle protein, keratins, lactalbumin, and blood having a protein concentration of at least about 30 percent with water in an amount sufficient to provide a final moisture content of from about 15 percent to about 40 percent by weight;

B. subjecting the moistened proteinaceous mixture to a temperature above 212°F. thereby converting it into a flowable substance;

C. extruding the flowable substance in a uniform linear flow as an extrudate into a medium of lower pressure while maintaining the density of the extrudate substantially the same;

D. placing the extrudate in a confined space;

E. subjecting the extrudate in the confined space to a temperature above 212°F. for a time of from 5 to 100 seconds and a pressure of from 100 psi to 250 psi; and F. instantly releasing the pressure on the extrudate within 2 seconds causing the extrudate to puff and resemble simulated meat;

said process further including admixing from about ½ to about 3 percent by weight of a lubricating substance comprising a member selected from the group edible fats and oils, edible fatty acids, edible stearates, and edible polylactic acid esters of fatty acids, with proteinaceous mixture of protein material prior to subjecting it to the elevated temperature.

The process of this invention requires the utilization of a proteinaceous mixture of a protein material comprising a member selected from the group consisting of oil seed vegetable protein, casein, caseinate salts, gelatin, microbiological protein, egg white, muscle protein, keratins, lactalbumin, and blood having protein concentrations of at least 30 percent by weight. The protein concentration must be at least about 30 percent by weight in order to provide a protein content sufficient to supply the dietary needs of a person consuming the product in lieu of meat or as a partial substitute therefor. The protein material of this invention can be oil seed vegetable protein, casein, caseinate salts, such as sodium caseinate, gelatin, microbiological protein such as yeast and single cell protein, egg white, muscle protein, keratins such as hoofs, hair and feathers, lactalbumin, and blood, either whole or as blood meal.

The first step in this process requires the admixing of a proteinaceous mixture of a protein material comprising a member selected from the group consisting of oil seed vegetable protein, casein, caseinate salts, gelatin, microbiological protein, egg white, muscle protein, keratins, lactalbumin, and blood with water in an amount sufficient to provide a final moisture content of from 15 to 40 percent by weight. The moisture can be readily adjusted within this range by one skilled in the art, but must be maintained within the range if later puffing is to produce a simulated meat product.

The first step of this process also includes the admixing of from about ½ to about 3 percent by weight of a lubricating substance with the proteinaceous mixture of protein material prior to subjecting it to the next step of increased shear or of elevation of pressure and temperature. The lubricating substance can be an edible fat or oil. The edible oil can include any residual fat in the protein material. The edible oil can be any edible oil although it is strongly preferred to use a vegetable oil, such as corn oil, etc., or coconut oil. In other words, the edible oil can be an animal oil or fat or a vegetable oil or mineral oil. In these cases, the edible oil is added in an amount of from about ½ to about 3 percent by weight. The added oil can also be in the form of an oil bearing cereal product or oil bearing grain. In these cases, sufficient cereal product or grain must be added to bring the overall added oil content to from about ½ to about 3 percent by weight. In other words, if the cereal product contains 50 percent by weight edible oil, then it should be added in an amount of from about 1 percent by weight to about 6 percent by weight to give the proper quantity of added edible oil. The added edible oil can also be in the form of an oil bearing animal product which also would be added in an amount sufficient to give an overall added oil content of from about ½ percent by weight to about 3 percent by weight. Thus, the added edible oil includes, but is not restricted to such things as oat flour, partially defatted soybean flour, full fat soybean flour, wheat germ, corn oil, vegetable oil, lard, corn germ, and edible mineral oils. It may also include such things as fatty acids produced by saponification of the required amount of edible oil or fat, an example being the well known food grade stearates or polylactic acid esters of fatty acids, e.g. sodium stearoyl-2-lactylate. If the amount of oil goes below about ½ percent by weight then the improvements are not significantly realized. If the amount of oil goes above about 3 percent by weight then the product begins to crumble and does not have the texture and appearance of meat. The added oil increases production rate and thus minimizes heat and pressure exposure which lead to degradation of the product.

The next step in this process requires subjecting the moistened oil containing proteinaceous mixture to increased shear to convert it into a flowable substance.

By use of the term "increased shear", we intend the standard usage such as an internal force tangential to the section on which it acts or the application of action or stress by the exerting of applied forces on the contiguous parts of the protein material causing one part to slide over the other with the resultant friction causing increased temperature and/or increased pressure. The increased temperature should be above 212°F. and the increased pressure should be superatmospheric pressure. A macaroni or spaghetti machine is excellent for producting the increased shear.

The next step in this process requires extruding the flowable substance in a uniform linear flow in an issued extrudate state into a medium of lower pressure in a condition whereat it does not simultaneously puff. In other words, this step requires passing the moistened proteinaceous mixture which has been subjected to an elevated pressure and temperature into a lower pressure range without puffing it. By use of the term "puffing" at this point in the process, it is simply meant expansion or that expansion must be prevented or that the density must not be substantially decreased. This consequently produces a glassy or glass-like surface on the outer portion of the extrudate. The extrudate has a translucent appearance and a laminar structure.

The next step in this process is preferred although not absolutely necessary and comprises reducing partially the moisture of the issued extrudate without puffing (expanding) it. This can be accomplished by any of the known drying methods such as a hot air stream or a conventional or microwave oven. The critical feature of this step of our invention, when it is used however, is that the extrudate must be partially dried without causing puffing (expansion).

The next steps in our process require placing the extrudate in a confined space and subjecting the extrudate in the confined space to a water-boiling temperature (i.e., at least 212°F.) for a time of from 5 to 100 seconds and a pressure of from 100 psi to 250 psi. One skilled in the art can readily decide what pressure and time exposure is necessary in order to give him the simulated meat product that he desires.

Finally, the pressure is suddenly released within 2 seconds on the extrudate causing the extrudate to puff (expand) within 2 seconds, and resemble simulated meat. The pressure releasing step can be accomplished merely by instantly opening the confined space wherein the extrudate has been confined at a higher pressure. The pressure must be released within 2 seconds to insure proper puffing of the material. When the extrudate is puffed, it can be dried somewhat or merely left to dry from its own retained heat thus forming a simulated meat product. The product of this invention bears a particularly close resemblance to chicken meat having an exterior skin portion and a fiberous inner portion very much like cooked chicken meat.

Referring to the present invention, the invention relates to a process, as well as the resulting improved products, of preparing a puffed, proteinaceous food product which, if desired, can be used as a food supplement for humans. The process involves: subjecting moist (e.g., crumbly to free-flowing), protein material comprising a member selected from the group consisting of oil seed vegetable protein, casein, caseinate salts, gelatin, microbiological protein, egg white, muscle protein, keratins, lactalbumin, and blood (having protein material which may or may not theretofore be at least partly neutralized, or may or may not be reacted to at least partly neutralized form) having a controlled amount of water and an edible oil to increased shear to form a moisture-containing, translucent to glassy product then having and having after being optionally dried and before being puffed, continuous structure that resists the rapid or sudden release of moisture therefrom at elevated temperatures but, under water-boiling puffing conditions, allows for the build-up of pressure in the product from moisture which, when rapidly or suddenly released from the product under water-boiling conditions, causes the product to puff; preferably, partly drying the translucent to glassy product; puffing the translucent to glassy product (regardless of whether or not the product was partly dried) within 2 seconds under water-boiling conditions; and, if desired, subdividing the product before puffing or subdividing the puffed product.

The structured or textured puffed product has good texture, water absorption or retention properties, and firmness in the essentially dry state and in water at room temperature, in boiling water, and when retorted. The terms "textured" or "structured" hereinafter sometimes refers to puffed proteinaceous products which when hydrated have the feel, firmness, structure, texture or bite qualities similar to natural food products, for example, such as meat, fish, poultry products, and the like, and puffed food products which are pleasing in the mouth of humans.

The protein materials which may be used in this process include the aforementioned protein materials having a protein content of at least about 30 percent or, preferably, a protein content of at least about 70 percent. If desired, such protein materials may be treated (e.g., with acids, acid salts, alkali metals, or alkaline earth metals hydroxides) so that it has a pH within the range of about 5.5 to 8.5.

As the pH of the protein material is lowered, there is a tendency for the puffed product to be somewhat tougher or have somewhat less of an ability to absorb or retain water.

When one wishes to produce a bland, puffed proteinaceous product, which for many purposes is preferred, the protein material should be substantially or essentially pure and have a high protein content. If one wishes to produce a puffed, proteinaceous food product which need not be completely bland, one may use proteinaceous materials of lower protein content.

If desired, the proteinaceous material may include, for some purposes, a desired, edible amount (e.g., preferably less than 50 percent) of a suitable cereal, starch, sugar, coloring material, seasoning or flavoring ingredient, or the like. Those materials may be present in or blended with the proteinaceous material before elevated pressure is applied. One may use, for example, wheat flour, corn starch, yellow corn flour, cane sugar, dextrose, and the like.

Furthermore, it has been found desirable to include an edible form of available calcium (e.g., calcium ions) in or with the proteinaceous material, at the time that material is subjected to elevated pressure for purposes of imparting a sturdier structure (e.g., skeleton-like structure) to the puffed, textured, proteinaceous product so that the puffed product has a higher degree of firmness or chewiness when that product is in an essentially dry state that exists after puffing and when it is subjected to rehydration. Although calcium tends to enhance the rehydrated texture of the puffed product, good or satisfactory rehydrated firmness or chewiness can be obtained without it. The calcium may be incorporated into the proteinaceous material in the form of an edible calcium salt such as dicalcium phosphate dihydrate, calcium chloride, or the like without imparting an undesired flavor to the puffed proteinaceous product.

The proteinaceous material is in a substantially uniform, moist (e.g., crumbly to free-flowing state and has a controlled, effective amount of water when it is subjected to increased shear. The moist material must be subjected to treatment under conditions, including sufficient increased shear, which result in that material being transformed into a workable, substantially homogeneous, deformable, flowable, coherent plastic mass which forms a moisture-containing, translucent to glassy product that is not puffed as a result of that treatment and has thermoplastic characteristics. It is preferred that essentially all of the moist proteinaceous material be transformed into the translucent to glassy product. Furthermore, the translucent to glassy product must retain some of its moisture until the product is later puffed in a separate and distinct operation.

The amount of water and edible oil present during the application of increased shear, the nature of the proteinaceous material, the conditions of temperature, pressure and time used in connection with the compaction operation, the nature of the particular equipment used for applying increased shear, and the particular characteristics sought (e.g., fine or coarse cells or texture) as a result of the later, separate puffing step, are interrelated and should be coordinated. Thus, when one operating condition is varied or selected, that condition in turn can influence the other desired operating conditions.

It has been found, for example, that if too high a temperature is reached or applied during the application of increased shear, the material is subjected to too high a temperature during the formation of the translucent to glassy product, the proteinaceous material has a tendency to discolor or develop a flavor as a result thereof (characteristics which are undesired when a bland, natural-colored, puffed product is sought) even though the later produced puffed product has a greater tendency to be firmer in texture when it is rehydrated. For this reason, the temperature of the product during the increased shear should be between 212° and 350°F. and the pressure superatmospheric.

The use of too low a temperature during compaction can prevent one from producing the desired translucent to glassy product or later result in producing a poorly puffed product that is rather soft or mushy. It is, therefore, necessary that one apply shear in a manner which gives the described texture without exposure to temperature and pressure conditions which degrade the material or cause loss in color and flavor.

The application of increased shear to the proteinaceous material tends to increase the temperature of that material. When even below water-boiling temperatures accompany the application of mechanical pressure such conditions may yet be sufficient to form the above referred to plastic mass and translucent to glassy product.

It may be necessary to apply external heat to the proteinaceous material so as to subject it to water-boiling temperatures during or in conjunction with the application of elevated pressure for the purpose of forming a plastic mass which is transformed into a translucent to glassy product, and in such instances the application of mechanical pressure is conducted in a system (e.g., extruder) that is closed during operation so as to obviate the loss of moisture from the material or system. In order to avoid simultaneously puffing the compacted material (subjected to a water-boiling temperature) when a flowable mass is discharged or ejected from the system into a medium of lower pressure or unconfined zone at atmospheric pressure, it is necessary to cool (e.g., temper) the mass or reduce its temperature to below water-boiling temperatures before the material is discharged or ejected from the system.

The controlled amount or concentration of water and edible oil present in or with the proteinaceous material which is subjected to increased shear and/or elevated pressure and requisite temperature conditions must be sufficient to facilitate converting that material to a plastic state which forms the translucent to glassy product.

The moisture content of the mixture, prior to the elevation of temperature and pressure, should be in the range of from 15 to 40 percent by weight.

When calcium is present with or in the protein material it may be desirable, for some purposes, to use a relatively high level of water (e.g., within the range of about 35 to 40 percent) to increase the water absorption or water retention properties of the puffed product when it is rehydrated in boiling water.

A variety of devices may be used to increase shear. One may use, for example, an extruder which subjects the moist proteinaceous material to sufficient pressure and temperature and forms a product of desired size and shape. When an extruder is used, it is essential not to discharge or eject the extrudate under water-boiling conditions, so that extrusion does not subject the material to simultaneous puffing which normally results from the rapid or sudden release of water vapor from the mass when or as the discharged or ejected extrudate enters a zone of lower pressure. Thus, if such pressures or temperatures are developed prior to the discharge or ejection of the plastic material through the restricted extrusion die, nozzle or orifice which would cause the issuing or issued extrudate to rapidly release water and puff, it is critical to reduce the temperature of the plastic mass so that it is not discharged or ejected under water-boiling or puffing conditions. The pressure differential across the die, nozzle or orifice thus must not cause the extrudate to puff.

Although a variety of injection molding machines, and thermoplastic extrusion and compression molding machines may be used in the forming of the plastic mass, one can advantageously use a heatable extruder having a rotating compression or compaction screw within a closed heatable barrel and temperature controllable, restricted extrusion die, nozzle or orifice at the front end of the barrel. The barrel, in conjunction with the compression or compaction screw, creates, during operation, a closed chamber which prevents the release of existing water vapor from the material and system. The rotating screw builds up sufficient pressure to cause the plastic mass to be pushed at the desired temperature and pressure to and through a die, nozzle or orifice. It is critical that the compressed, flowable material not be discharged or ejected from the extruder under water-boiling or puffing conditions for the reasons explained above. Therefore, it may be necessary to reduce the temperature of the plastic mass in the extruder by using a cooling or tempering operation or step immediately before discharging or ejecting the extrudate from the extruder. The temperature of the plastic mass may be reduced, in the extruder, for example, by using an extruder having an elongated nozzle or extension which communicates with the restricted die or orifice opening and from which the extrudate is ejected or discharged in the desired configuration (e.g., as an unpuffed, rod, ribbon or string) under atmospheric conditions. The plastic mass or flowable substance must be extruded or issued in uniform linear flow in an issued extrudate state. The extension, for example, may be air-cooled or may include a jacket through which cooling fluid (e.g. water) may be circulated.

In the event one wishes to produce a puffed product having a relatively coarse texture, relatively large cells, and which has more of a tendency to become soft when rehydrated, which properties may be acceptable for making snacks, then the translucent to glassy product may be puffed in a separate and distinct operation without first being partly dried.

The grain or cell structure of the textured, puffed food product is related to the puffing conditions used in the moisture content of the translucent to glassy product. Since such textured food products will simulate or be used in or with a wide variety of foods, it is difficult to single out the "best" operating conditions. Generally, it has been found that finer cells result from the puffing operation when the translucent to glassy product to be puffed has a relatively low moisture content. The moisture content of the translucent to glassy product can be reduced to the desired moisture level of from 10 to 25 percent by conventional means (e.g., air drying). One may partly dry the moisture-containing, translucent to glassy material, for example, with air at room temperature or hot circulating air at a temperature within the range of about 70° to 350°F., preferably within the range of about 130° to 250°F. Low heat is preferred, however, to prevent undesirable color and flavor changes.

The translucent to glassy product, regardless of whether or not it has been partly dried, has a continuous structure that resists the rapid or sudden release of moisture therefrom at elevated temperatures but, under water-boiling puffing conditions, allows for the build-up of pressure in the product from moisture which, when rapidly or suddenly released from the product under water-boiling puffing conditions (e.g., at water-boiling temperature), causes the product to puff or to be texturized.

The puffing step involves subjecting the moisture-containing, translucent to glassy product (regardless of whether or not it has been partly dried) to water-boiling conditions by subjecting it to water boiling temperature, i.e., above 212°F. for from 5 to 100 seconds and at a pressure of from 100 to 250 psi and then suddenly releasing the pressure to cause puffing. The puffing operation expands the product (e.g., about 2–10 fold in volume as compared with the volume of the translucent to glassy product as it exists prior to puffing) and produces an expanded, structured, textured, porous product having cells formed by the sudden release of moisture. It is desirable to conduct the puffing step under conditions (e.g., moisture, time and temperature conditions) which obviate the development of undesired taste or flavor or discoloration. Furthermore, the puffing step should be conducted under conditions which cause substantially all of the translucent to glassy product to puff substantially uniformly.

One may, if desired, dry the puffed product to a desired residual moisture content. The puffed product, on contact with water, has good stability, is chewy, resists disintegration, and does not become soft and mushy. In addition, the puffed product can have a high bulk specific volume (e.g., at least about 4cc./gm.). The puffed product, on contact with boiling water has the texture of natural meat and particularly poultry meat.

DESCRIPTION OF THE PREFERRED EMBODIMENT

The following examples are provided in order to more fully define and explain our invention.

Example 1

100 parts by weight of defatted soy flour having a pH of about 7 and a moisture content of from 4 to 5 percent is admixed with 2 parts by weight dicalcium phosphate dihydrate and 50 parts by weight water. The final mixture has a moisure content of about 37 percent by weight and a pH of about 7. The product is extruded using a laboratory Brabender extruder with a 3 to 1 compaction screw which rotated at 95 rpm. The extruder has a heated barrel temperature of 130°C and a die temperature of 165°C. The extruder has an air-cooled 8-inch pipe extension at the end of the extrusion barrel which had been flattened to eject the extrudate in the form of a ribbon about ½-inch wide and about ⅛-inch high. The ejected non-puffed glassy product is air dried to a moisture content of about 15 percent by weight.

The partly dried glassy extrudate is puffed by placing it in a cereal puffing gun of the type described in U.S. Pat. No. 1,878,782, and injecting live steam at about 395°F. and about 220 psi pressure for about 25 seconds. The puffing gun was instantly opened to release the pressure and cause the product to puff. The puffed product was rehydrated by placing it in water and is found to closely resemble the texture of natural chicken meat.

Example 2

Example 1 is repeated except 2 parts by weight corn oil is added to the soy flour. The glassy product is produced at least 20 percent faster than in Example 1 and the resulting product is lighter in color and more nearly resembles meat than the product of Example 1. The flavor of the product is also superior to that in Example 1.

Example 3

Example 2 is repeated except the soy flour is replaced by soy protein isolate. The product has an excellent color and resembles meat and is produced at a rate at least 20 percent faster than in Example 1.

Example 4

Example 2 is repeated except the soy flour is replaced by soy protein concentrate. The product has an excellent color and resembles meat and is produced at a rate at least 20 percent faster than in Example 1.

Example 5

Example 2 is repeated except the corn oil is replaced with ½ part by weight calcium stearate. The product has an excellent color and resembles meat and is produced at a rate at least 20 percent faster than in Example 1.

Example 6

Example 2 is repeated except the corn oil is replaced with 1 part by weight glycerol. The product has an excellent color and resembles meat and is produced at a rate at least 20 percent faster than in Example 1.

Example 7

Example 2 is repeated except the corn oil is replaced with ½ part by weight sodium stearoyl-2-lactylate. The product has an excellent color and resembles meat and is produced at a rate at least 20 percent faster than in Example 1.

Example 8

Example 2 is repeated except the corn oil is replaced with 10 parts by weight full fat soy flour (containing 18 percent by weight soybean oil). The product has an excellent color and resembles meat and is produced at a rate at least 20 percent faster than in Example 1.

Example 9

Example 2 is repeated except the live steam is injected into the puffing gun at a pressure of about 250 psi for a time of about 17 seconds. Again, the color of the more rapidly produced simulated meat product so produced is excellent.

Example 10

100 parts by weight of casein is added to 100 parts by weight yellow corn flour and 100 parts by weight water. The final moisture content is about 35 percent by weight. The product is extruded using a laboratory Brabender extruder with a 3 to 1 compaction screw which rotates at 95 rpm. The extruder has a heated barrel temperature of 130°C. and a die temperature of 165°C. The extruder has an air-cooled 8-inch pipe extension at the end of the extrusion barrel which has been flattened to eject the extrudate in the form of a ribbon about ½- inch wide and about ⅛-inch high. The ejected non-puffed glassy product is air dried to a moisture content of about 15 percent by weight.

The partly dried glassy extrudate is puffed by placing it in a cereal puffing gun of the type described in U.S. Pat. No. 1,878,782 and injecting live steam at about 395°F. and about 220 psi pressure for about 25 seconds. The puffing gun is suddenly opened to release the pressure and cause the product to puff. The puffed product is rehydrated by placing it in water and is found to closely resemble the texture of natural chicken meat.

Example 11

Example 10 is repeated except 4 parts by weight corn oil is added to the casein. The production rate of the glassy extrudate is at least 20 percent above that in Example 10 and the product is less "burned" or brown than the product in Example 10. Both the color and flavor of the product of this example more closely resembles that of meat than does the product of Example 10.

Example 12

Example 11 is repeated except sodium caseinate is used in place of casein. The color of the more rapidly (20 percent faster) produced product is found to be very good as a simulated meat product and superior to the product of Example 10.

Example 13

Example 11 is repeated except the steam is injected into the puffing gun at a pressure of about 250 psi for a time of about 17 seconds. Again, the color of the more rapidly (20 percent faster) produced product is found to be excellent as a simulated meat product and superior to the product of Example 10.

Example 14

Example 11 is repeated except the corn oil is replaced with ½ part by weight calcium stearate. The product has an excellent color and resembles meat and is produced at a rate at least 20 percent faster than in Example 10.

Example 15

Example 11 is repeated except the corn oil is replaced with 1 part by weight glycerol. The product has an excellent color and resembles meat and is produced at a rate at least 20 percent faster than in Example 10.

Example 16

Example 11 is repeated except the corn oil is replaced with ½ part by weight sodium stearoyl-2-lactylate. The product has an excellent color and resembles meat and is produced at a rate at least 20 percent faster than in Example 10.

Example 17

Example 11 is repeated except the corn oil is replaced with 10 parts by weight full fat soy flour (containing 18 percent by weight soybean oil). The product has an excellent color and resembles meat and is produced at a rate at least 20 percent faster than in Example 10.

Example 18

100 parts by weight of gelatin is added to 100 parts by weight yellow corn flour and 100 parts by weight water. The final moisture content is about 35 percent by weight. The product is extruded using a laboratory Brabender extruder with a 3 to 1 compaction screw which rotated at 95 rpm. The extruder has a heated barrel temperature of 130°C. and a die temperature of 165°C. The extruder has an air-cooled 8-inch pipe extension at the end of the extrusion barrel which has been flattened to eject the extrudate in the form of a ribbon about ½-inch wide and about ⅛-inch high. The ejected non-puffed glassy product is air dried to a moisture content of about 15 percent by weight.

The partly dried glassy extrudate is puffed by placing it in a cereal puffing gun of the type described in U.S. Pat. No. 1,878,782 and injecting live steam at about 395°F. and about 220 psi pressure for about 25 seconds. The puffing gun is suddenly opened to release the pressure and cause the product to puff. The puffed product is rehydrated by placing it in water and is found to closely resemble the texture of natural chicken meat.

Example 19

Example 18 is repeated except 4 parts by weight corn oil is added to the gelatin. The product is produced at a production rate of at least 20 percent greater than that of Example 1 and more nearly resembles meat texture than the product of Example 18.

Example 20

Example 19 is repeated except the protein material is egg white instead of gelatin. The color of this product is found to closely resemble meat and is superior to a product produced without the oil.

Example 21

Example 19 is repeated except the protein material is blood meal instead of gelatin. The color of this product is found to closely resemble meat and is superior to a product produced without the oil.

Example 22

Example 19 is repeated except the corn oil is replaced with ½ part by weight calcium stearate. The product has an excellent color and resembles meat and is produced at a rate at least 20 percent faster than in Example 18.

Example 23

Example 19 is repeated except the corn oil is replaced with 1 part by weight glycerol. The product has an excellent color and resembles meat and is produced at a rate at least 20 percent faster than in Example 18.

Example 24

Example 19 is repeated except the corn oil is replaced with ½ part by weight sodium stearoyl-2-lactylate. The product has an excellent color and resembles meat and is produced at a rate at least 20 percent faster than in Example 18.

Example 25

Example 19 is repeated except the corn oil was replaced with 10 parts by weight full fat soy flour (containing 18 percent by weight soybean oil). The product has an excellent color and resembles meat and is produced at a rate at least 20 percent faster than in example 18.

Example 26

Example 19 is repeated except the live steam is injected into the puffing gun at a pressure of about 250 psi for about 17 seconds. Again, the color of the product is found to be very good.

In each of the examples produced under the claims of this invention the product is free of a "burned" color and taste and is far superior to any products every produced without the oil added. Since oils are normally to be very strictly avoided in extrusion of protein materials, this invention is unusual and produces a new result.

Having fully described this new and unique invention, the invention is claimed as follows:

1. A process for preparing a puffed food product simulating meat comprising:
   A. mixing a proteinaceous material comprising at least 30 percent by weight protein with water, said material being selected from the group consisting of oil seed vegetable protein, casein, caseinate salts, gelatin, microbiological protein, egg white, muscle protein, keratins, lactalbumin, and blood and said water being sufficient to provide a final moisture content after conversion to a plastic condition and extrusion without puffing of from about 15 to about 40 percent by weight;
   B. subjecting the mixture of material and water to shear sufficient to convert it into a plastic condition;
   C. extruding the plastic mixture in a uniform linear flow as an extrudate into a medium of lower pressure without puffing;
   D. placing the extrudate in a confined space;
   E. subjecting the extrudate in the confined space to a temperature above 212°F. for a time of from 5 to 100 seconds and a pressure of from 100 to 250 psi; and
   F. instantly releasing the pressure within 2 seconds on the extrudate causing the extrudate to puff and resemble meat;

said process further including admixing from about ½ to about 3 percent by weight of a lubricating substance consisting of a member selected from the group consisting of oil bearing cereals, oil bearing grains edible fats and oils, edible fatty acids, edible stearates, and edible polylactic acid esters of fatty acids, with the proteinaceous material prior to subjecting it to the increased shear sufficient to convert it into a plastic condition.

2. A process as in claim 1 wherein the lubricating substance is admixed in an amount of 2 percent by weight.

3. A process as in claim 1 wherein the lubricating substance is corn oil.

4. A process as in claim 1 wherein the material comprising at least 30 percent by weight protein is gelatin.

5. A process as in claim 1 wherein the material is comprising at least 30 percent by weight protein is microbiological protein.

6. A process as in Claim 1 wherein the material comprising at least 30 percent by weight protein is egg white.

7. A process as in claim 1 wherein the material comprising at least 30 percent by weight protein is muscle protein.

8. A process as in claim 1 wherein the material comprising at least 30 percent by weight protein is a keratin.

9. A process as in claim 1 wherein the material comprising at least 30 percent by weight protein is lactalbumin.

10. A process as in claim 1 wherein the material comprising at least 30 percent by weight protein is blood.

11. A process as in claim 1 wherein the mixture has the pH adjusted to from 5.5 to 8.5 prior to subjecting it to the increased shear.

12. A process as in claim 1 wherein the material converted into a plastic condition has the moisture thereof partially reduced without puffing prior to placing the extrudate in a confined space.

13. A process as in claim 1 wherein the lubricating substance is a member selected from the group consisting of vegetable oil, animal oil or fat, oil bearing cereals, oil bearing grains, mineral oil, food grade stearates, and polylactic acid esters of fatty acids.

14. A process as in claim 1 wherein the lubricating substance is coconut oil.

15. A process of preparing a puffed food product which comprises subjecting moist protein material selected from the group consisting of oil seed vegetable protein, casein, caseinate salts, gelatin, microbiological protein, egg white, muscle protein, keratins, lactalbumin, and blood and comprising at least 30 percent by weight protein in the presence of sufficient water and under physical conditions sufficient to form a moisture-containing translucent to glassy product in a plastic condition, partly drying said translucent to glassy product to reduce its moisture content and puffing said partly dried product by placing the extrudate in a confined space; subjecting the extrudate in a confined space to a temperature above 212°F. for a time of from 5 to 100 seconds and a pressure of from 100 to 250 psi; and instantly releasing the pressure within 2 seconds on the extrudate causing the extrudate to puff and resemble meat;

said process further including admixing from about ½ to about 3 percent by weight of a lubricating substance selected from the group consisting of edible fats and oils, edible fatty acids, edible stearates, edible polylactic acid esters of fatty acids and oil bearing cereals or grains with the moist protein material.

16. A process as in claim 15 wherein the lubricating substance is corn oil.

17. A process as in claim 15 wherein the lubricating substance is admixed in an amount of 2 percent by weight.

18. A process as in claim 15 wherein the protein material is gelatin.

19. A process as in claim 15 wherein the protein material is microbiological protein.

20. A process as in claim 15 wherein the protein material is egg white.

21. A process as in claim 15 wherein the protein material is muscle protein.

22. A process as in claim 15 wherein the protein material is a keratin.

23. A process as in claim 15 wherein the protein material is lactalbumin.

24. A process as in claim 15 wherein the protein material is blood.

25. A process as in claim 15 wherein the mixture has the pH adjusted to from 5.5 to 8.5 prior to forming it into a moisture-containing translucent to glassy product.

26. A process as in claim 15 wherein the lubricating substance is a member selected from the group consisting of vegetable oil, animal oil or fat, oil bearing cereals or grains, mineral oil, food grade stearates, and polylactic acid esters of fatty acids.

27. A process as in claim 15 wherein the lubricating substance is coconut oil.

28. A process for preparing a puffed food product simulating meat comprising:
- A. mixing a material comprising at least 30 percent by weight protein with water sufficient to provide a moisture content after conversion to a plastic condition and extrusion without puffing of from about 15 to about 40 percent by weight, said material being selected from the group consisting of oil seed vegetable protein, casein, caseinate salts, gelatin, microbiological protein, egg white, muscle protein, keratins, lactalbumin, and blood;
- B. subjecting the mixture of material and water to pressure sufficient to convert it into a plastic condition;
- C. extruding the plastic mixture in a uniform linear flow as an extrudate into a medium of lower pressure without puffing;
- D. placing the extrudate in a confined space;
- E. subjecting the extrudate in the confined space to a temperature above 212°F. for a time of from 5 to 100 seconds and a pressure of from 100 to 250 psi; and
- F. instantly releasing the pressure within 2 seconds on the extrudate causing the extrudate to puff and resemble meat;

said process further including admixing from about ½ to about 3 percent by weight of a lubricating substance selected from the group consisting of edible fats and oils, edible fatty acids, edible stearates, edible polylactic acid esters of fatty acids, oil bearing cereals and oil bearing grains with the material comprising at least 30 percent by weight protein prior to subjecting it to the pressure sufficient to convert it into a plastic condition.

29. A process for preparing a puffed food product simulating meat comprising:
- A. mixing a material comprising at least 30 percent by weight protein with water sufficient to provide a moisture content after conversion to a plastic condition and extrusion without puffing of from about 15 to about 40 percent by weight, said material being selected from the group consisting of oil seed vegetable protein, casein, caseinate salts, gelatin, microbiological protein, egg white, muscle protein, keratins, lactalbumin, and blood;
- B. subjecting the mixture of material and water to a temperature sufficient to convert it into a plastic condition;
- C. extruding the plastic mixture in a uniform linear flow as an extrudate into a medium of lower pressure without puffing;
- D. placing the extrudate in a confined space;
- E. subjecting the extrudate in the confined space to a temperature above 212°F. for a time of from 5 to 100 seconds and a pressure of from 100 to 250 psi; and
- F. instantly releasing the pressure on the extrudate within 2 seconds, causing the extrudate to puff and resemble said process further including admixing from about ½ to about 3 percent by weight of a lubricating substance selected from the group consisting of edible fats and oils, edible fatty acids, edible stearates, and edible polylactic acid esters of fatty acids with the material containing at least 30 percent by weight protein prior to subjecting it to the elevated temperature sufficient to convert it into a plastic condition.

* * * * *

UNITED STATES PATENT OFFICE
CERTIFICATE OF CORRECTION

PATENT NO. : 3,917,876

DATED : November 4, 1975

INVENTOR(S) : Charles C. Harwood and Donald W. Quass

It is certified that error appears in the above-identified patent and that said Letters Patent are hereby corrected as shown below:

Item 73 in the heading should read --Assignees: The Quaker Oats Company and The Griffith Laboratories, Inc., both of Chicago, Illinois--.

In Line 25 of Claim 29 after "resemble" read --meat;--

Signed and Sealed this twenty-seventh Day of January 1976

[SEAL]

Attest:

RUTH C. MASON
*Attesting Officer*

C. MARSHALL DANN
*Commissioner of Patents and Trademarks*